US010215904B2

United States Patent
Weng et al.

(10) Patent No.: US 10,215,904 B2
(45) Date of Patent: Feb. 26, 2019

(54) BACKLIGHT MODULE AND DISPLAY DEVICE

(71) Applicants: Radiant Opto-Electronics (Suzhou) Co., Ltd., Jiangsu (CN); Radiant Opto-Electronics Corporation, Kaohsiung (TW)

(72) Inventors: Chin-Ting Weng, Kaohsiung (TW); Yue-Heng Lee, Kaohsiung (TW); Chia-Yin Chang, Kaohsiung (TW)

(73) Assignees: Radiant Opto-Electronics (Suzhou) Co., Ltd., Jiangsu (CN); Radiant Opto-Electronics Corporation, Kaohsiung (TW)

( * ) Notice: Subject to any disclaimer, the term of this patent is extended or adjusted under 35 U.S.C. 154(b) by 0 days.

(21) Appl. No.: 15/602,126

(22) Filed: May 23, 2017

(65) Prior Publication Data

US 2017/0343722 A1 Nov. 30, 2017

Related U.S. Application Data

(63) Continuation of application No. PCT/CN2016/086056, filed on Jun. 16, 2016.

(30) Foreign Application Priority Data

May 31, 2016 (CN) .......................... 2016 1 0378708

(51) Int. Cl.
*F21V 8/00* (2006.01)

(52) U.S. Cl.
CPC .......... *G02B 6/0016* (2013.01); *G02B 6/002* (2013.01); *G02B 6/0038* (2013.01); *G02B 6/0043* (2013.01); *G02B 6/0053* (2013.01)

(58) Field of Classification Search
CPC .. G02B 6/0038; G02B 6/0053; G02B 6/0036; G02B 6/0031; G02B 6/0028;
(Continued)

(56) References Cited

U.S. PATENT DOCUMENTS 7,665,876 B2 * 2/2010 Taya .................... G02B 6/0053
362/330
8,272,774 B2 9/2012 Yi et al.
(Continued)

FOREIGN PATENT DOCUMENTS

CN 101382254 A 3/2009
CN 101430069 A 5/2009
(Continued)

*Primary Examiner* — Alan B Cariaso
(74) *Attorney, Agent, or Firm* — CKC & Partners Co., LLC

(57) ABSTRACT

A backlight module and a display device are provided. The backlight module includes a light guide plate, a light source and a first prism film. The light guide plate includes a main body and plural oblique microstructures. The main body has a light-incident surface and at least one main surface connected to the light-incident surface. The main surface has a first area and a second area. The oblique microstructures are disposed in the first area. Each of the oblique microstructures has a first slope. A light source is disposed adjacent to the light-incident surface. The first prism film is disposed in front of the light guide plate. The first prism film has plural first prism microstructures. Each of the first prism microstructures has a second slope. One of the first slope and the second slope is a positive number, and the other one is a negative number.

20 Claims, 4 Drawing Sheets

(58) Field of Classification Search
CPC .... G02B 6/0068; G02B 6/0016; G02B 6/002; G02B 6/0043
USPC ................ 362/606, 607, 610, 615, 620
See application file for complete search history.

(56) References Cited

U.S. PATENT DOCUMENTS

| | | | |
|---|---|---|---|
| 8,814,412 B2* | 8/2014 | Yabe | G02B 6/002 362/606 |
| 8,894,264 B2* | 11/2014 | Takada | G02B 6/0088 362/606 |
| 8,960,983 B2* | 2/2015 | Jia | G02B 6/003 362/607 |
| 9,453,956 B2* | 9/2016 | Wu | G02B 6/002 |
| 2014/0146563 A1* | 5/2014 | Watanabe | G02B 6/0043 362/606 |
| 2017/0176663 A1* | 6/2017 | Furuta | G02B 6/0031 |

FOREIGN PATENT DOCUMENTS

| | | |
|---|---|---|
| CN | 102081186 A | 6/2011 |
| JP | 4172008 B2 | 10/2008 |
| TW | 201510614 A | 3/2015 |

* cited by examiner

BACKLIGHT MODULE AND DISPLAY DEVICE

RELATED APPLICATIONS

This application is a continuation application of International Application No. PCT/CN2016/086056 filed Jun. 16, 2016, which claims priority to China Application Serial Number 201610378708.X, filed on May 31, 2016, which is incorporated herein by reference.

BACKGROUND

Field of Invention

The present invention relates to a light source module. More particularly, the present invention relates to a backlight module and its applications in a display device.

Description of Related Art

Light-emitting diodes are generally used as plural point light sources in a backlight module. After entering a light guide plate from its side surfaces, light generated by the light-emitting diodes is emitted from a light-emitting surface of the light guide plate to form a planar light source. When the backlight module is applied to a display device, a prism sheet is often used together with the backlight module. Therefore, the light emitted from the light guide plate can first pass through the prism sheet, enter a display panel of the display device, and then be emitted out from the display panel, thereby achieving the objective of increasing light brightness in an orthogonal view. However, because sizes of the prisms on the prism sheet are relatively close to sizes of pixels of the display panel, and the prisms are arranged in a direction parallel to a side of the backlight module, the moire phenomenon is likely to occur, thus affecting the display effect of display device. Therefore, for prevent the moire phenomenon from occurring, a conventional skill uses an improved prism sheet having prisms which is rotated relative to the backlight module by an angle (3-15 degrees).

However, because each light-emitting diode has a limited light-emitting directivity angle, dark bands between every two adjacent light-emitting diodes corresponding to the light guide plate is generated to cause the problem of poor illumination uniformity, which is also referred to "bright and dark bands". When the improved prism sheet is in used, the rotated prisms will cause the inclination of the bright and dark bands, thus seriously affecting light-emitting effect of the display device. Moreover, the improved prism sheet cannot be used together with a conventional light guide plate which is used to solve the problem of bright and dark bands.

SUMMARY

One objective of the present invention is to provide a backlight module and a display device which have better light-emitting effect.

According to the aforementioned objective, a backlight module is provided. The backlight module includes a light guide plate, a light source and a first prism film. The light guide plate includes a main body and plural oblique microstructures. The main body has a light-incident surface and at least one main surface connected to the light-incident surface. The main surface has a first area and a second area, and the first area is disposed nearer the light-incident surface than the second area. The oblique microstructures are disposed in the first area, in which each of the oblique microstructures has a first slope. A light source is disposed adjacent to the light-incident surface of the light guide plate. The first prism film is disposed in front of the light guide plate. The first prism film has plural first prism microstructures, and each of the first prism microstructures has a second slope. One of the first slope and the second slope is a positive number, and the other one of the first slope and the second slope is a negative number.

According to an embodiment of the present invention, the main body has an axis vertical to the light-incident surface. Each of the oblique microstructures extends along a first extending direction, in which there is a first included angle between the first extending direction and the axis. Each of the first prism microstructures extends along a second extending direction, in which there is a second included angle between the second extending direction and the axis. A sum of the first included angle and the second included angle is substantially equal to degrees.

According to an embodiment of the present invention, the first area and the second area are arranged along the axis.

According to an embodiment of the present invention, the backlight module further includes a second prism film disposed between the first prism film and the light guide plate. The second prism film has plural second prism microstructures, and an extending direction of each of the second prism microstructures is not vertical to the light-incident surface.

According to an embodiment of the present invention, the light guide plate further includes plural stripe microstructures disposed on the second area of the at least one main surface. The at least one main surface is a light-emitting surface.

According to an embodiment of the present invention, an extending direction of each of the stripe microstructures is vertical to the light-incident surface.

According to an embodiment of the present invention, the light guide plate further includes plural dot microstructures disposed on the second area of the main surface. The at least one main surface is a reflecting surface.

According to an embodiment of the present invention, the main body includes a tapered portion and a flat portion. The tapered portion has a first end and a second end opposite to each other, in which a thickness of the first end is greater than a thickness of the second end. The flat portion connected to the second end of the tapered portion, in which a thickness of the flat portion is equal to the thickness of the second end.

According to an embodiment of the present invention, the at least one main surface is located on the flat portion.

According to the aforementioned objective, a display device is provided. The display device includes the aforementioned backlight module and a display panel. The display panel is disposed in front of the first prism film.

According to the aforementioned embodiments of the present invention, the light guide plate and the first prism film are respectively implemented with the oblique microstructures and the first prism microstructures that are mutually matched. Accordingly, after the light emitted from the oblique microstructures of the light guide plate enters the first prism microstructures, the first prism microstructures of the first prism film can redirect the light emitted from the oblique microstructures, so as to ensure the light to be emitted out vertically from the first prism film, thus promoting the light-emitting effect. On the other hand, the first prism film of the present invention also can be adapted to cooperate with the conventional light guide plate which is used to solve the bright and dark band problem, so as to achieve the aforementioned objectives.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
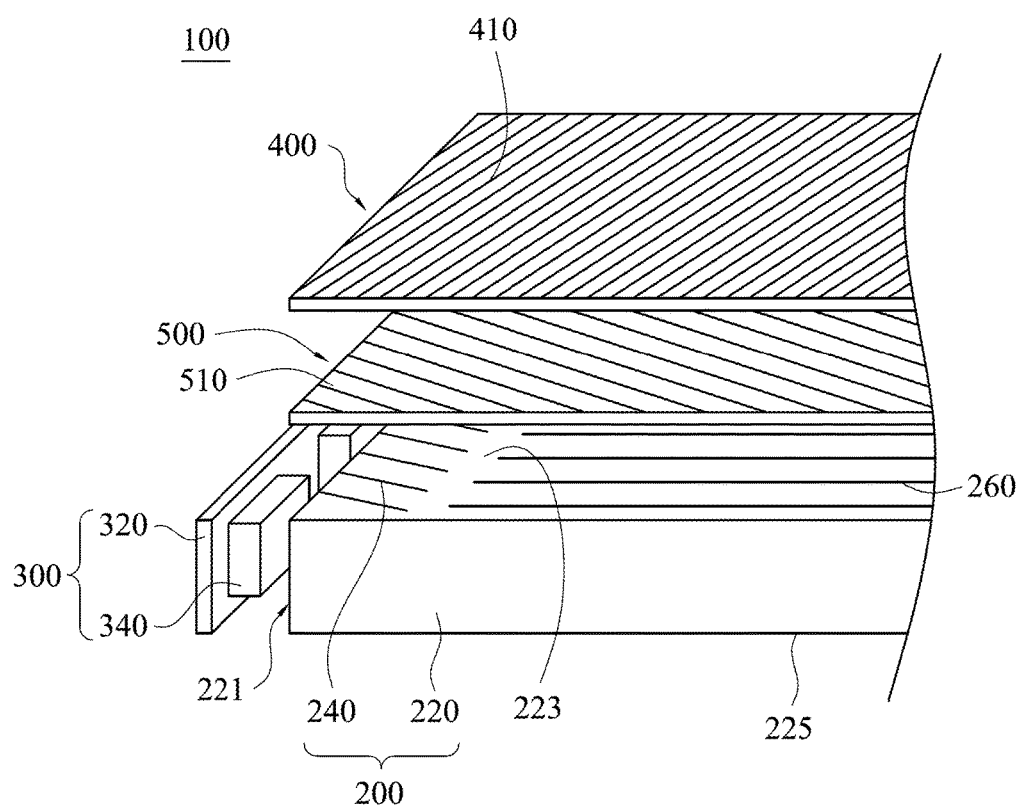
FIG. 1 is a schematic partial structural diagram showing a backlight module in accordance with a first embodiment of the present invention.

Reference will now be made in detail to the present embodiments of the invention, examples of which are illustrated in the accompanying drawings. Wherever possible, the same reference numbers are used in the drawings and the description to refer to the same or like parts.

Referring to FIG. 1, FIG. 1 is a schematic partial structural diagram showing a backlight module 100 in accordance with a first embodiment of the present invention. The backlight module 100 of the present embodiment mainly includes a light guide plate 200, a light source 300, a first prism film 400 and a second prism film 500. The light source 300 is disposed adjacent to the light guide plate 200 and can provide light into the light guide plate 200. The light source 300 includes a circuit board 320 and plural light-emitting diodes 340 disposed on the circuit board 320, in which the light-emitting diodes 340 are electrically connected to the circuit board 320. As shown in FIG. 1, the light guide plate 200 includes a main body 220 and plural oblique microstructures 240 disposed on the main body 220. The oblique microstructures 240 are used to mix light between every two adjacent light-emitting diodes 340 and mix light adjacent to a light-incident portion of the light guide plate 200, thereby enhancing the luminance uniformity of the backlight module 100.

Figure 2A:
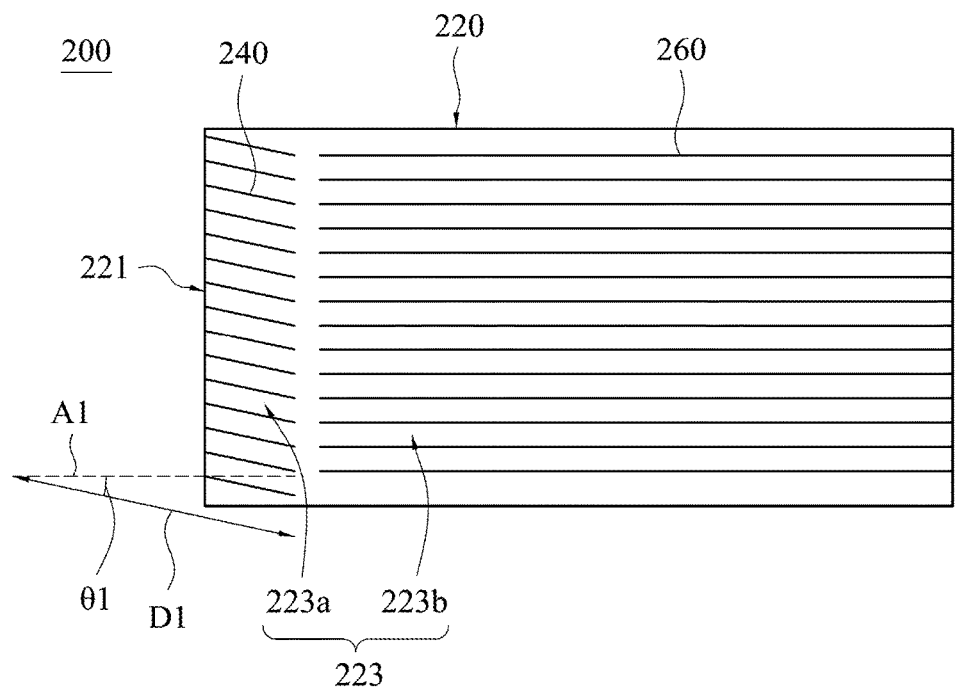
FIG. 2A is a schematic top view of a light guide plate in accordance with the first embodiment of the present invention.

Simultaneously referring to FIG. 1 and FIG. 2A, FIG. 2A is a schematic top view of the light guide plate 200 in accordance with the first embodiment of the present invention. The main body 220 includes a light-incident surface 221 and at least one main surface. In the present embodiment, the number of the main surface is two, in which one of the main surfaces is a light-emitting surface 223, and the other one of the main surfaces is a reflecting surface 225. The reflecting surface 225 and the light-emitting surface 223 are respectively connected to two opposite sides of the light-incident surface 221. In the present embodiment, the oblique microstructures 240 are disposed on the light-emitting surface 223. As shown in FIG. 2A, the main body 220 of the light guide plate 200 has an axis A1, and an extending direction of the axis A1 is vertical to an extending direction of the light-incident surface 221 and an extending direction of the light source 300. The light-emitting surface 223 includes a first area 223a and a second area 223b. In the present embodiment, the first area 223a and the second area 223b are arranged along the axis A1. The first area 223a is disposed near the light-incident surface 221, and the second area 223b is disposed away from the light-incident surface 221. In the present embodiment, the first area 223a is referred to as a non-display area, and one portion of the light-emitting surface located in this area is covered by an outer frame of the backlight module 100. The second area 223b is referred to as an active area, and the other portion of the light-emitting surface located in this area is not covered by the outer frame of the backlight module 100. In the present embodiment, the oblique microstructures 240 are disposed in the first area 223a. Each of the oblique microstructures 240 is inclined relative to the axis A1 and has a first slope.

Figure 2B:
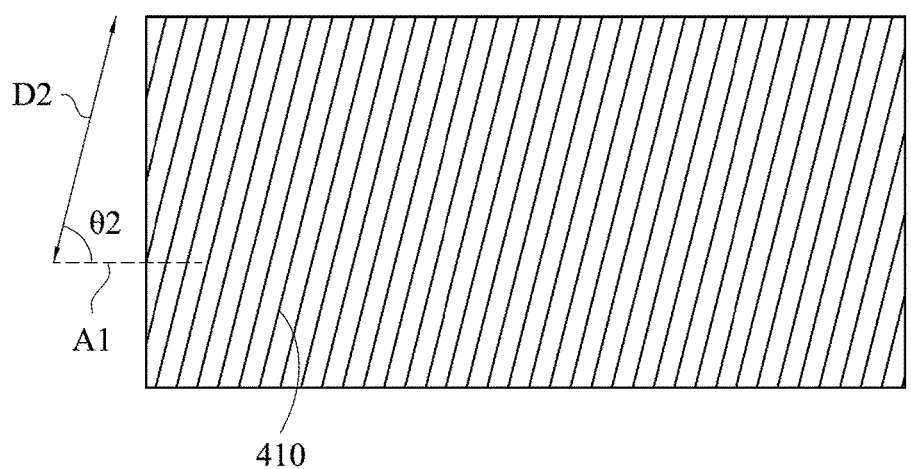
FIG. 2B is a schematic top view of a first prism film in accordance with the first embodiment of the present invention.

Referring to FIG. 1 and FIG. 2B, FIG. 2B is a schematic top view of the first prism film 400 in accordance with the first embodiment of the present invention. In the present embodiment, the first prism film 400 is disposed adjacent to the light-emitting surface 223 of the light guide plate 200. The first prism film 400 has plural first prism microstructures 410. Each of the first prism microstructures 410 is a stripe structure, and each of the first prism microstructures 410 is inclined relative to the axis A1 and has a second slope. In the present embodiment, one of the first slope and the second slope is a positive number, and the other one of the first slope and the second slope is a negative number. In other words, an inclined direction of the first prism microstructures 410 is opposite to an inclined direction of the oblique microstructures 240 on the light guide plate 200.

Simultaneously referring to FIG. 1, FIG. 2A and FIG. 2B, in the present embodiment, the oblique microstructures 240 on the light guide plate 200 extend along the first extending direction D1, and there is a first included angle θ1 between the first extending direction D1 and the axis A1. In addition, the first prism microstructures 410 on the first prism film 400 extend along the second extending direction D2, and there is a second included angle θ2 between the second extending direction D2 and the axis A1. In the present embodiment, a sum of the first included angle θ1 and the second included angle θ2 is substantially equal to 90 degrees. In one example, when the first slope is a positive number, the first included angle θ1 is 30 degrees, the second slope is a negative number, and the second included angle θ2 is 60 degrees, it represents that each of the oblique microstructures 240 has an positive angle of inclination relative to the axis A1 by 30 degrees, and each of the first prism microstructures 410 has an negative angle of inclination relative to the axis A1 by 60 degrees.

Referring to FIG. 1 again, the second prism film 500 is disposed between the light guide plate 200 and the first prism film 400. The second prism film 500 has plural second prism microstructures 510, and an extending direction of the second prism microstructures 510 is inclined relative to the axis A1. In other words, the extending direction of the second prism microstructures 510 is not vertical to the extending direction of the light-incident surface 221 of the main body 220. Therefore, light emitted from the light source 300 can first enter the light guide plate 200 and pass through the oblique microstructures 240 and then enter the second prism film 500 and the first prism film 400 sequentially, thereby ensuring the light to be emitted from the first prism film 400 vertically. It is noted that, if there is no oblique microstructure 240 on the light guide plate, after the light emitted from the light guide plate passes through the prism sheet 400 having the first prism microstructures 410, the bright and dark bands near a light-incident side will be inclined and extend over the active area. Therefore, the oblique microstructures 240 disposed on the main body 220 of the light guide plate 200 not only can be used to mix light between every two adjacent light-emitting diodes 340, but also can be used to adjust light-emitting direction of light emitted from the oblique microstructures 240. Therefore, after emitted from the oblique microstructures 240 and entering the first prism microstructures 410, light can be adjusted by the oblique microstructures 240 to be emitted vertically from the first prism film 400.

Referring to FIG. 1 and FIG. 2A, in the present embodiment, the light guide plate 200 includes plural stripe microstructures 260 disposed on the second area 223b of the light-emitting surface 223. In one embodiment, an extending direction of the stripe microstructures 260 is vertical to the light-incident surface 221. The stripe microstructures 260 are used to increase the light brightness and the degrees of illumination uniformity of the light guide plate 200.

Figure 3:
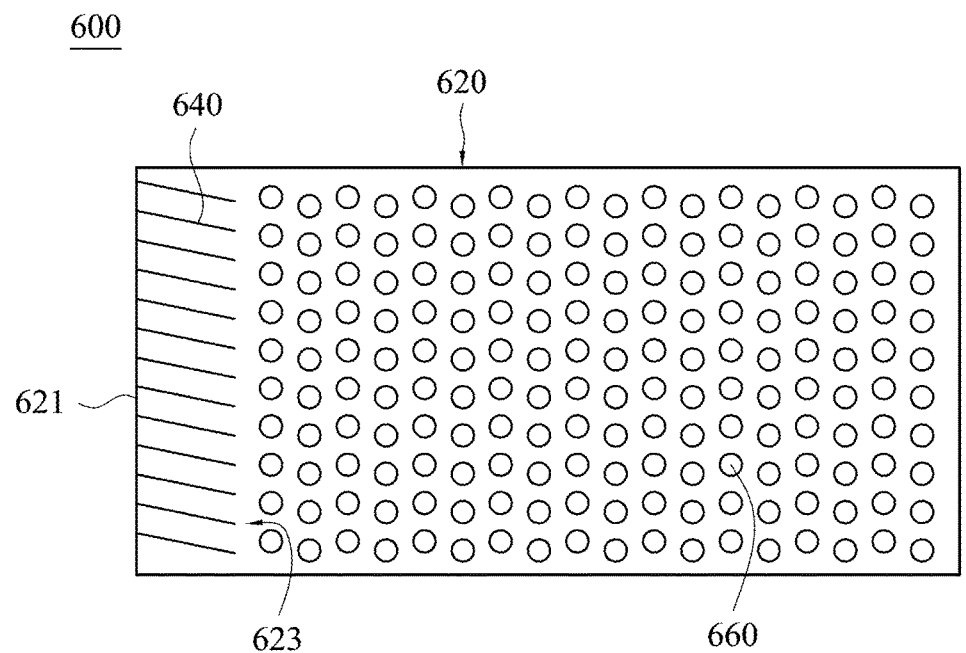
FIG. 3 is a schematic top view of a light guide plate in accordance with a second embodiment of the present invention.

In the present invention, the light guide plate may have different designs. Referring to FIG. 3, FIG. 3 is a schematic top view of a light guide plate 600 in accordance with a second embodiment of the present invention. The light guide plate 600 includes a main body 620 and plural oblique microstructures 640 disposed on the main body 620. The main body 620 has a light-incident surface 621 and at least one main surface. In the present embodiment, the number of the main surface is two, in which one of the main surfaces is a reflecting surface 623, and the other one of the main surfaces is a light-emitting surface. The reflecting surface 623 and the light-emitting surface are respectively connected to two opposite sides of the light-incident surface 621. In the present embodiment, the oblique microstructures 640 are disposed on the reflecting surface 623. It is noted that the light guide plate 600 of the present embodiment can be used to replace the light guide plate 200 shown in FIG. 1. In addition, it is noted that, the design of the oblique microstructures 640 on the light guide plate 600 is similar to that of the oblique microstructures 240 of the light guide plate 200 so that the light guide plate 600 can be adapted to cooperate with the first prism microstructures 410 on the first prism film 400, and therefore will not be described again herein.

Referring to FIG. 3, in the present embodiment, the light guide plate further includes plural dot microstructures 660. The dot microstructures 660 are disposed on a portion of the reflecting surface 623 which is not implemented with the oblique microstructures 640. The dot microstructures 660 are used to increase the light brightness and the degrees of illumination uniformity of the light guide plate 600.

Figure 4:
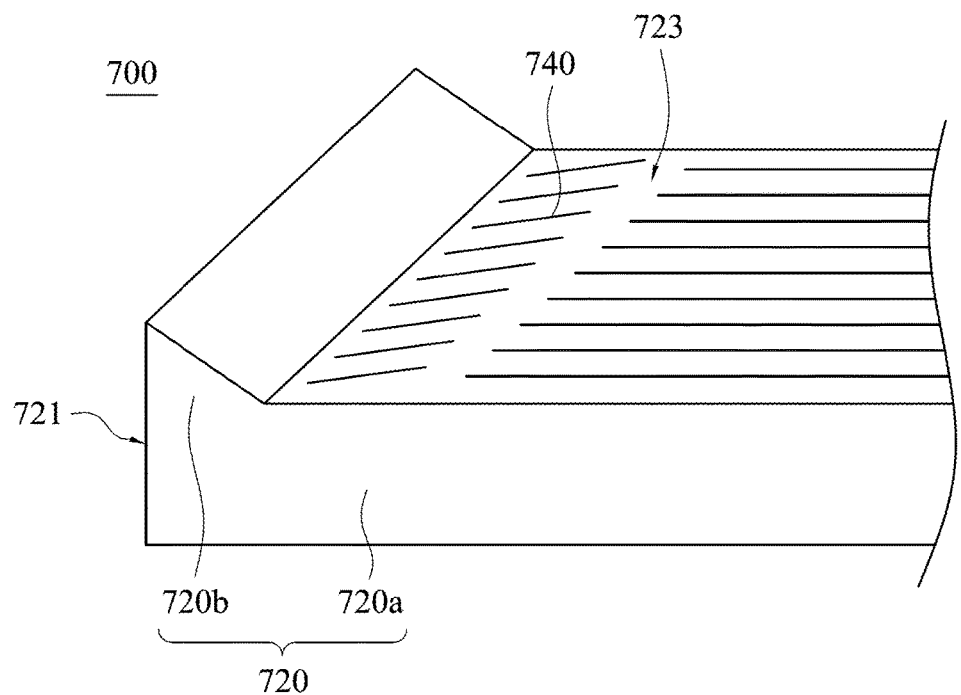
FIG. 4 is a schematic partial structural diagram showing a light guide plate in accordance with a third embodiment of the present invention.

It is noted that the light guide plate is not limited to a plate-type design. In other embodiments, the light guide plate can be a tapered light guide plate. Referring to FIG. 4, FIG. 4 is a schematic partial structural diagram showing a light guide plate 700 in accordance with a third embodiment of the present invention. As shown in FIG. 4, the light guide plate 700 includes a main body 720 and plural oblique microstructures 740. In the present embodiment, the main body 720 includes a flat portion 720a and a tapered portion 720b connected to the flat portion 720a. The main body 720 has a light-incident surface 721 and a main surface 723, in which the light-incident surface 721 is located on a side of the tapered portion 720b, and the main surface 723 is located on the flat portion 720a. In the present embodiment, the main surface 723 is a light-emitting surface, and the oblique microstructures 740 are disposed on the main surface 723. In other embodiments, the oblique microstructures 740 can be simultaneously disposed on the tapered portion 720b and the flat portion 720a, so as to meet multiple user requirements. It is noted that the light guide plate 700 of the present embodiment can be used to replace the light guide plate 200 shown in FIG. 1. In addition, the design of the oblique microstructures 740 on the light guide plate 700 is similar to that of the oblique microstructures 240 of the light guide plate 200 so as to cooperate with the first prism microstructures 410 on the first prism film 400, and therefore will not be described again herein.

Figure 5:
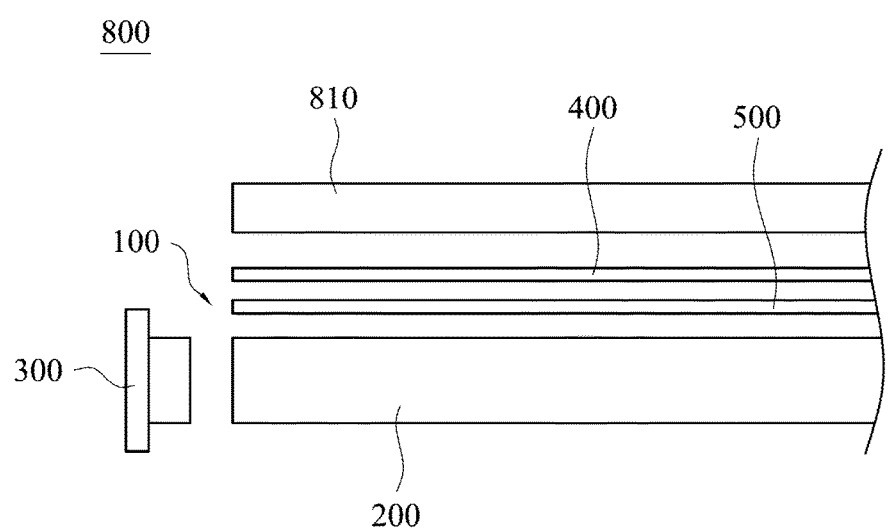
FIG. 5 is a schematic partial structural diagram showing a display device in accordance with an embodiment of the present invention.

Referring to FIG. 5, FIG. 5 is a schematic partial structural diagram showing a display device 800 in accordance with an embodiment of the present invention. The display device 800 of the present embodiment includes the backlight module 100 as shown in FIG. 1 and a display panel 810. As shown in FIG. 5, the display panel 810 is disposed on a light-emitting side of the backlight module 100, and light emitted from the backlight module 100 can enter the display panel 810, so as to achieve the aforementioned objectives and will not be described therein. It is noted that, the backlight module 100 having the light guide plate 200 shown in FIG. 1 is merely used as an example applied to the display device 800 for explanation, and embodiments of the present invention are not limited thereto. In other embodiments, other backlight modules, such as the backlight modules having the light guide plate 600 or 700 also can be applied to a display device, so as to achieve the same effect.

According to the aforementioned embodiments of the present invention, the light guide plate and the first prism film are respectively implemented with the oblique microstructures and the first prism microstructures that are mutually matched. Accordingly, after the light emitted from the oblique microstructures of the light guide plate enters the first prism microstructures, the first prism microstructures of the first prism film can redirect the light emitted from the oblique microstructures, so as to ensure the light to be emitted out vertically from the first prism film, thus promoting the light-emitting effect. On the other hand, the first prism film of the present invention also can be adapted to cooperate with the conventional light guide plate which is used to solve the bright and dark band problem, so as to achieve the aforementioned objectives.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:
1. A backlight module, comprising:
  a light guide plate, comprising:
    a main body having a light-incident surface and at least one main surface connected to the light-incident surface, wherein the main surface has a first area and a second area, and the first area is disposed nearer the light-incident surface than the second area; and a plurality of oblique microstructures disposed in the first area, wherein each of the oblique microstructures has a first slope when viewed in a direction substantially normal to the main surface;

a light source disposed adjacent to the light-incident surface of the light guide plate; and a first prism film is disposed on the top of the light guide plate, wherein the first prism film has a plurality of first prism microstructures, and each of the first prism microstructures has a second slope when viewed in the direction substantially normal to the main surface;

wherein one of the first slope and the second slope is a positive number, and the other one of the first slope and the second slope is a negative number;

wherein the main surface has a first side edge and a second side edge opposite to the first side edge, and the first side edge forms an upper or lower edge of the light-incident surface and runs along a length of the light-incident surface;

wherein one end of each oblique microstructure is connected to the first side edge, and the other end of each oblique microstructure is disconnected to the second side edge.

2. The backlight module of claim 1, wherein the main body has an axis vertical to the light-incident surface;

each of the oblique microstructures extends along a first extending direction, wherein there is a first included angle between the first extending direction and the axis;

each of the first prism microstructures extends along a second extending direction, wherein there is a second included angle between the second extending direction and the axis; and wherein a sum of the first included angle and the second included angle is substantially equal to 90 degrees.

3. The backlight module of claim 2, wherein the first area and the second area are arranged along the axis.

4. The backlight module of claim 1, further comprising a second prism film disposed between the first prism film and the light guide plate, wherein the second prism film has a plurality of second prism microstructures, and an extending direction of each of the second prism microstructures is not vertical to the light-incident surface.

5. The backlight module of claim 1, wherein the light guide plate further comprises a plurality of stripe microstructures disposed on the second area of the at least one main surface; and the at least one main surface is a light-emitting surface.

6. The backlight module of claim 5, wherein an extending direction of each of the stripe microstructures is vertical to the light-incident surface.

7. The backlight module of claim 1, wherein the light guide plate further comprises a plurality of dot microstructures disposed on the second area of the main surface; and the at least one main surface is a reflecting surface.

8. The backlight module of claim 1, wherein the main body comprises:

a tapered portion having a first end and a second end opposite to each other, wherein a thickness of the first end is greater than a thickness of the second end; and a flat portion connected to the second end of the tapered portion, wherein a thickness of the flat portion is equal to the thickness of the second end.

9. The backlight module of claim 8, wherein the at least one main surface is located on the flat portion.

10. A display device, comprising:

a backlight module of claim 1; and a display panel disposed on the top of the first prism film.

11. The display device of claim 10, wherein the main body has an axis vertical to the light-incident surface;

each of the oblique microstructures extends along a first extending direction, wherein there is a first included angle between the first extending direction and the axis;

each of the first prism microstructures extends along a second extending direction, wherein there is a second included angle between the second extending direction and the axis;

wherein a sum of the first included angle and the second included angle is substantially equal to about 90 degrees.

12. The display device of claim 11, wherein the first area and the second area are arranged along the axis.

13. The display device of claim 10, wherein the backlight module further comprises a second prism film disposed between the first prism film and the light guide plate, wherein the second prism film has a plurality of second prism microstructures, and an extending direction of each of the second prism microstructures is not vertical to the light-incident surface.

14. The display device of claim 10, wherein the light guide plate further comprises a plurality of stripe microstructures disposed on the second area of the at least one main surface; and the at least one main surface is a light-emitting surface.

15. The display device of claim 14, wherein an extending direction of each of the stripe microstructures is vertical to the light-incident surface.

16. The display device of claim 10, wherein the light guide plate further includes a plurality of dot microstructures disposed on the second area of the main surface; and the at least one main surface is a reflecting surface.

17. The display device of claim 10, wherein the main body comprises:

a tapered portion having a first end and a second end opposite to each other, wherein a thickness of the first end is greater than a thickness of the second end; and a flat portion connected to the second end of the tapered portion, wherein a thickness of the flat portion is equal to the thickness of the second end.

18. The display device of claim 17, wherein the at least one main surface is located on the flat portion.

19. The backlight module of claim 1, wherein the first area is planar with the second area.

20. The backlight module of claim 1, wherein the main surface has a third side edge and a fourth side edge opposite to the third side edge, the third side edge and the fourth side edge are perpendicular to the first side edge and the second side edge, and said other end of each oblique microstructure is further spatially separated from the third side edge and the fourth side edge.

* * * * *